US009357080B2

(12) United States Patent
Beaucoup et al.

(10) Patent No.: US 9,357,080 B2
(45) Date of Patent: May 31, 2016

(54) SPATIAL QUIESCENCE PROTECTION FOR MULTI-CHANNEL ACOUSTIC ECHO CANCELLATION (71) Applicant: Broadcom Corporation, Irvine, CA (US)

(72) Inventors: Franck Pascal Beaucoup, Vancouver (CA); Aleksander Radisavljevic, Victoria (CA); Wilfrid Paul LeBlanc, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 101 days.

(21) Appl. No.: 13/945,423

(22) Filed: Jul. 18, 2013

(65) Prior Publication Data
US 2014/0357322 A1 Dec. 4, 2014

Related U.S. Application Data (60) Provisional application No. 61/830,724, filed on Jun. 4, 2013.

(51) Int. Cl.
*H04M 9/08* (2006.01)
(52) U.S. Cl.
CPC ..................... *H04M 9/082* (2013.01)
(58) Field of Classification Search
None
See application file for complete search history.

(56) References Cited

U.S. PATENT DOCUMENTS

| 6,430,295 | B1 * | 8/2002 | Handel et al. ............... 381/94.7 |
| 6,563,925 | B1 * | 5/2003 | Krasny ..................... 379/406.05 |
| 6,583,806 | B2 * | 6/2003 | Ludwig et al. ............. 348/14.08 |
| 6,618,481 | B1 * | 9/2003 | Schmidt .................... 379/406.14 |
| 8,787,587 | B1 * | 7/2014 | Murgia et al. ............... 381/71.1 |
| 2007/0189507 | A1 * | 8/2007 | Tittle et al. ............... 379/406.01 |
| 2009/0164212 | A1 * | 6/2009 | Chan et al. .................. 704/226 |
| 2009/0169027 | A1 * | 7/2009 | Ura et al. ...................... 381/66 |
| 2012/0250882 | A1 * | 10/2012 | Mohammad et al. ........ 381/94.1 |
| 2014/0286497 | A1 * | 9/2014 | Thyssen et al. ................ 381/66 |
| 2014/0328490 | A1 * | 11/2014 | Mohammad et al. .......... 381/66 |

OTHER PUBLICATIONS

Goetze, Stefan, et al., Enhanced Partitioned Stereo Residual Echo Estimation, IEEE Asilomar Conference on Signals, Systems and Computers, Pacific Grove, California, Oct. 29, 2006, 5 pages.
Goetze, Stefan, et al., Residual Echo Power Spectral Density Estimation Based on an Optimal Smoothed Misalignment for Acoustic Echo Cancelation, in Proc. Int. Workshop on Acoustic Echo and Noise Control (IWAENC-2005), Eindhoven, The Netherlands, Sep. 2005, 4 pages.

(Continued)

*Primary Examiner* — Ashish K Thomas
(74) *Attorney, Agent, or Firm* — Brinks Gilson & Lione (57) ABSTRACT

A system performs residual echo suppression on a microphone signal that receives, e.g., voice commands, and that is exposed to echo from multiple speakers. An example is a smartphone that receives voice commands while the smartphone is playing music through stereo speakers. The system estimates residual echo level in different ways, and determines which estimate to use. The technique responds well to the difficult to handle scenario of a spatially quiescent image suddenly transitioning to a spatially rich image. Even in the face of such difficult scenarios, the system detects and removes residual echo from the microphone signal, instead of allowing the undesired residual echo to pass through.

20 Claims, 5 Drawing Sheets (56) References Cited

OTHER PUBLICATIONS

CA Technologies, CA Unified Communications Monitor—Addressing Echo in VoIP Systems; Understanding and Monitoring Echo Cancellation for Optimal VoIP Performance, Islandia, New York, Jul. 8, 2013, 14 pages.

Hansler, Eberhard, et al., Acoustic Echo and Noise Control—A Practical Approach, pp. 221-265, 303-347 and 349-370, John Wiley & Sons, Inc., Hoboken, New Jersey, 2004.

\* cited by examiner

SPATIAL QUIESCENCE PROTECTION FOR MULTI-CHANNEL ACOUSTIC ECHO CANCELLATION

CROSS REFERENCE TO RELATED APPLICATIONS

This application claims priority to provisional application Ser. No. 61/830,724, filed Jun. 4, 2013, which is incorporated by reference in its entirety.

TECHNICAL FIELD

This disclosure relates to audio processing. This disclosure also relates to echo cancellation and suppression.

BACKGROUND

Rapid advances in electronics and communication technologies, driven by immense customer demand, have resulted in the widespread adoption of electronic devices of every kind. In many cases the devices include both multiple channel audio output capability, as well as microphone input capability. Moreover, these capabilities may operate simultaneously, e.g., when a smartphone accepts speech input while it is playing music. Improvements in echo reduction on the microphone input will further enhance the performance of such devices.

DETAILED DESCRIPTION

A system performs residual echo suppression and echo cancellation of a microphone signal that receives, for example, voice commands, and that is exposed to echo from multiple speakers. An example application of the system is in a smartphone that receives voice commands while the smartphone is playing music through stereo speakers. The system estimates residual echo level in different ways, and determines which estimate to use for residual echo suppression. As is described in detail below, the system responds well to the difficult to handle scenario of spatially quiescent audio output (e.g., audio output from strongly correlated channels) suddenly transitioning to spatially rich audio output (e.g., audio output from weakly correlated channels). Further discussion of what is meant by spatial richness and spatial quiescence are provided below in the discussion of FIG. 3. Even in the face of such difficult scenarios, the system detects and removes residual echo from the microphone signal, instead of allowing the undesired residual echo to pass through.

The system will be described in greater detail below with respect to the Figures. The system may be implemented in many different ways. Some characteristics of the system include: 1) the system is transparent during periods of spatial quiescence and during periods of spatial richness; 2) the system changes the way it performs residual echo suppression, in response to a trigger caused by a transition from spatial quiescence to spatial richness; and 3) the system is effective even if only provided with the echo reference signals, e.g., the system does not need to have the ability to modify any audio signals that the system receives for output to the loudspeakers and that might generate echo, before the system delivers the audio signals to the loudspeakers. As one example, the change may be applying an increased amount of residual echo suppression on the microphone input channel. As other examples, the change may include timing, parameter, or modeling changes to the way in which residual echo suppression is determined, applied, or maintained on the microphone input channel.

The system is described below with respect to two audio channels, e.g., Left and Right channel stereo audio channels. Note, however, that the system extends to more than two channels. In a system that processes more than two channels, the cross-channel linear predictors may be replaced by many-to-one channel predictors. Note also that the system is not limited to cross-channel linear prediction, but may employ any approach to receive correlation estimation. Similarly, the system described below uses echo return loss (ERL) and echo return loss enhancement (ERLE) trackers to estimate the residual echo level, but the system may use other approaches, such as system distance tracking.

As just one implementation example, the system may include a microphone input, a first audio channel output (e.g., Left audio out), and a second audio channel output (e.g., Right audio out). The system may include a cross channel predictor or cross channel correlation estimator logic configured to perform an estimation or prediction analysis on the first audio channel and the second audio channel, and responsively output a prediction error level and a prediction gain, e.g., on a per channel basis, resulting from the prediction analysis.

The system may further include echo cancellation tracking logic configured to obtain multiple echo cancellation factors and output an echo cancellation estimate for a particular channel that is a function of (e.g., the sum of) the multiple echo cancellation factors. The multiple echo cancellation factors may include echo return loss (e.g., ERL) and echo canceller attenuation (e.g., ERLE). For instance, the echo return loss may be the echo return loss through an acoustic environment to the microphone input, and the echo canceller attenuation may be the attenuation applied by an echo canceller to the signal on the microphone input. The echo canceller thereby generates an (echo) attenuated microphone output.

The system may further include residual echo analysis logic configured to determine multiple different residual echo level estimates for a given channel, and select an applicable estimate for subsequent processing (e.g., subsequent residual echo suppression) from among the multiple different residual echo level estimates. As will be explained further below, the multiple residual echo level estimates are, e.g., different estimates of residual echo level for the same channel in the echo-cancelled microphone signal. Regarding the multiple residual echo level estimates, the residual echo analysis logic may obtain an expected echo level on the microphone input and determine a first residual echo level estimate responsive to the echo cancellation estimate and the expected echo level. The residual echo analysis logic may also maintain an offset responsive to the prediction error level and the prediction gain, and determine a second residual echo level estimate responsive to the prediction error level, echo cancellation estimate, and the offset.

Expressed another way, a system may include multiple audio output channels and one or more microphone inputs, any of which may be subject to the residual echo suppression techniques described below. The system may further include a correlation predictor or estimator in communication with the multiple audio output channels, perform a prediction analysis on the output channels, and output a prediction error level resulting from the prediction analysis. Decision logic in the system may then maintain an offset responsive to the prediction error level, obtain an echo cancellation estimate and an expected echo level, and determine multiple residual echo level estimates for each receive channel. In particular, the decision logic may determine a first residual echo level estimate using the echo cancellation estimate and the expected echo level, and may determine a second residual echo level estimate using the prediction error level, echo cancellation estimate, and the offset. The decision logic determines which of the first residual echo level estimate and the second residual echo level estimate to use for residual echo suppression on the microphone input for each receive channel.

The echo suppression system may be implemented in virtually any type of user equipment (UE). Accordingly, the discussion below makes reference to UE, which may take many different forms and have many different functions. As one example, UE may be a 2G, 3G, or 4G/LTE cellular phone capable of making and receiving wireless phone calls, playing music, and transmitting and receiving data. The UE may also be a smartphone that, in addition to making and receiving phone calls, runs any number or type of applications. UE may be virtually any device that transmits and receives information, including as additional examples a driver assistance module in a vehicle, an emergency transponder, a pager, a satellite television receiver, a networked stereo receiver, a computer system, music player, or virtually any other device.

Figure 1:
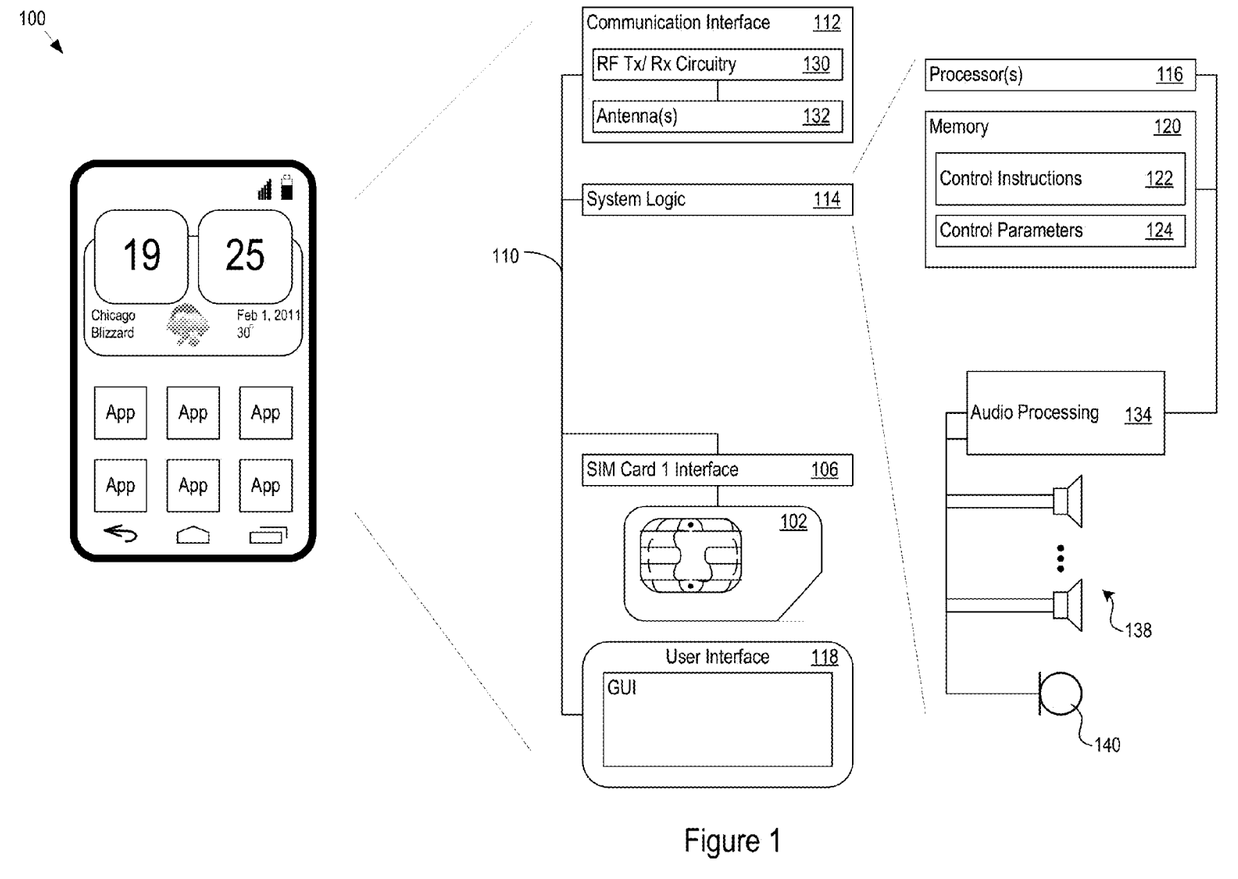
FIG. 1 shows an example of user equipment.

FIG. 1 shows an example of user equipment (UE) 100 that may include the echo suppression techniques. In this example, the UE 100 supports one or more Subscriber Identity Modules (SIMs), such as the SIMI 102. An electrical and physical interface 106 connects SIMI 102 to the rest of the user equipment hardware, for example, through the system bus 110.

The user equipment 100 includes a communication interface 112, system logic 114, and a user interface 118. The system logic 114 may include any combination of hardware, software, firmware, or other logic. The system logic 114 may be implemented, for example, in one or more systems on a chip (SoC), application specific integrated circuits (ASIC), or other circuitry. The system logic 114 is part of the implementation of any desired functionality in the UE 100. In that regard, the system logic 114 may include logic that facilitates, as examples, outputting audio; receiving microphone input; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 may include a graphical user interface, touch sensitive display, voice or facial recognition inputs, buttons, switches, speakers and other user interface elements.

In the communication interface 112, Radio Frequency (RF) transmit (Tx) and receive (Rx) circuitry 130 handles transmission and reception of signals through the antenna(s) 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, pre-amplifiers, power amplifiers and/or other logic for transmitting and receiving through one or more antennas, or through a physical (e.g., wireline) medium.

As implementation examples, the communication interface 112 and system logic 114 may include BCM43341, BCM2048 or BCM2049 Bluetooth solutions, a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processor or a BCM25331 Athena™ baseband processor. These devices or other similar system solutions may be extended as described below to provide the additional functionality described below. These integrated circuits, as well as other hardware and software implementation options for the user equipment 100, are available from Broadcom Corporation of Irvine Calif.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interface 112 may support transmission and reception under the Bluetooth and Bluetooth Low Energy (BLE) standards. The techniques described below, however, are applicable to other communications technologies.

The system logic 114 may include one or more processors 116 and memories 120. The system logic 114 may also include audio processing logic 134. The audio processing logic 134 may facilitate driving the speakers 138 with multi-channel audio output from the system. The interface to the speakers 138 may include any combination of physical wiring and wireless connections. For example, the speakers 138 may be the left and right channel speakers physically connected to a system logic board in a laptop computer. As another example, the speakers may be Bluetooth, 802.11/a/b/g/n or 60 GHz WiGig connected speakers. The audio processing logic 134 may also facilitate receiving and processing input signals captured by the microphone 140, and sending those signals to any other logic for further processing. In other implementations, the memory 120 may store, for example, control instructions 122 that the processor 116 executes to carry out any of the echo cancellation or suppression processing described below. In that regard, the control parameters 124 may provide and specify configuration and operating options for the control instructions 122. The control parameters 124 may be user configurable and may include, as examples, time constants, frequency bin centers and widths, offset increments and decrements, and other tuning parameters. The control parameters 124 may be implemented in various types of memory spaces accessed in various manners.

Figure 2:
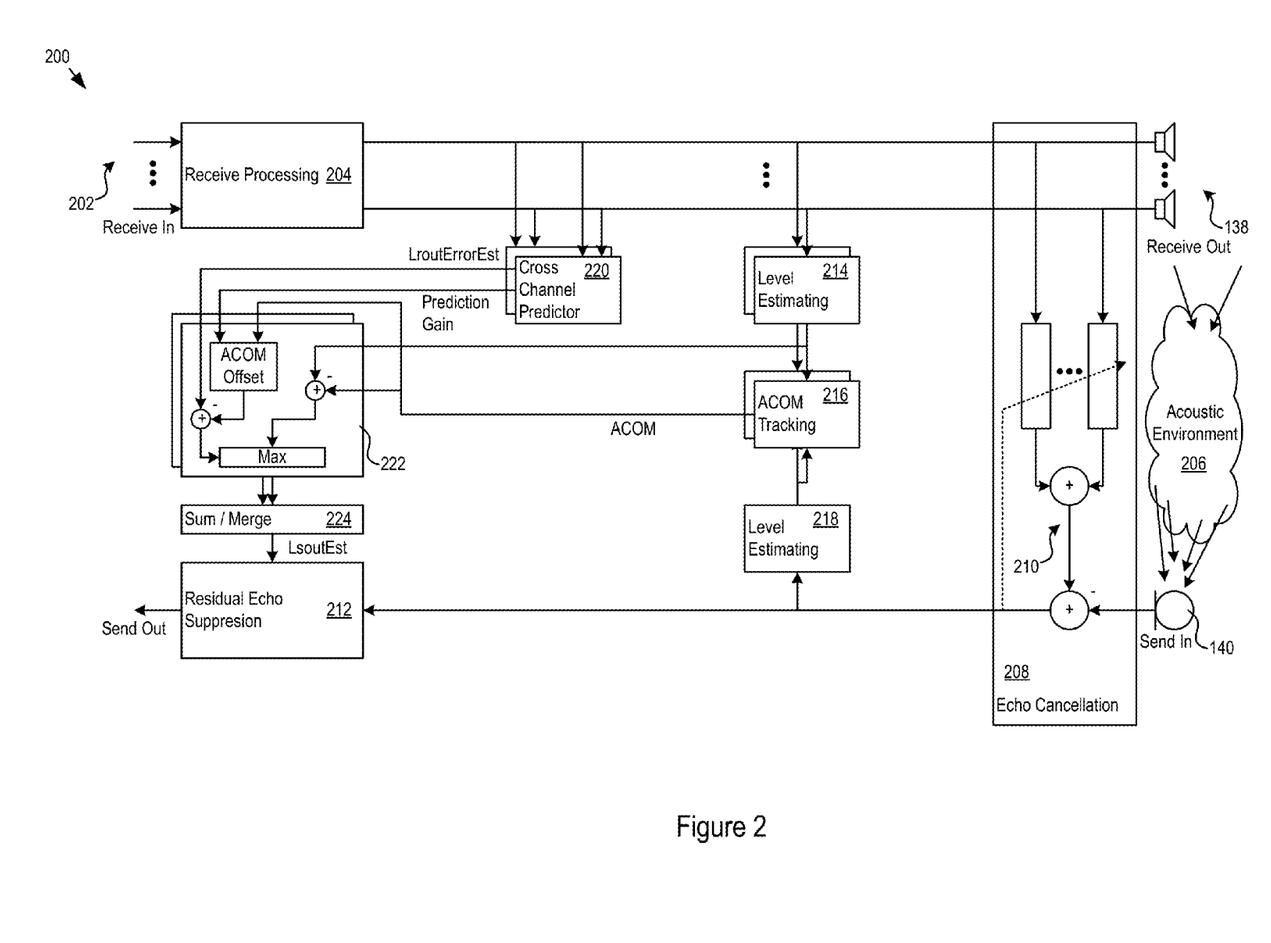
FIG. 2 is an example of an audio processing system.

FIG. 2 shows an example system implementation 200 of the audio processing logic 134. The implementation 200 receives multiple (i.e., 2 or more) receive-in channels 202 that the receive processing logic 204 processes. The receive-in channels may be left and right channel audio signals, 4, 5.1, 7.1, 9.1 or any other set of audio channels. The receive processing logic 204 performs any desired processing on the audio channels, such as decoding, upmixing or downmixing, gain control, equalization, deliberate introduction of non-linearities (e.g., for echo cancellation purposes), and amplification, and drives the speakers 138 with the processed signals as the receive out path. The non-linearities may include, as an example, non-linear distortions that de-correlate the speaker channels as an aid to echo cancellation. The residual echo suppression techniques described below do not require the system to include the capability to inject non-linearities, however.

The acoustic signals generated by the speakers 138 enter the acoustic environment 206. In many cases, echoes of the acoustic signals return through the acoustic environment 206 to the microphone 140. The echoes are therefore present as an undesired component of the microphone input signal. In one sense, the undesired component is not desired because it obscures, distorts, masks, or otherwise hinders the reason for which the microphone is in use, such as to convey voice commands to the system, to receive audio input for a voice call, or for other reasons.

An echo canceller 208 is also present. The echo canceller 208 includes adaptive echo cancellation filters 210 that make a first attempt to remove the undesired component from the microphone input, while preserving desired signal (e.g., speech input). The filters 210 attempt to remove, from the microphone signal, signal content that is as close as possible to the echo signal received by the microphone 140. The echo canceller 208 is often very effective in this regard, though in most situations residual echo still remains after echo cancellation. Furthermore, conventional echo cancellation may often be less effective in some common scenarios. Such scenarios include transitions from spatial quiescence to spatial richness, and changes in spatial image.

The system performs residual echo suppression, e.g., in the frequency domain, using the residual echo suppression logic 212. That is, for a given frequency, the residual echo suppression may determine how much residual echo is expected (knowing the signals sent to the speakers 138). The residual echo suppression may then compare the actual level input into the residual echo suppression logic 212 and decide whether to apply echo suppression to the microphone signal (after the echo cancellation 208). For example, if it appears that the microphone signal contains mostly residual echo, then the residual echo suppression logic 212 may heavily suppress the suspected residual echo in the microphone signal, but when the microphone signal contain mostly desired signal (e.g. speech), then the residual echo suppression logic 212 may allow the microphone signal to pass with little or no echo suppression.

The residual echo suppression logic 212 may implement, e.g. a Wiener filter to remove the residual echo (the undesired signal) in the frequency domain, full-band domain, or sub-band domain. To that end, the residual echo suppression logic 212 obtains an estimate of the residual echo in the microphone signal (after the echo canceller 208), and may use a Wiener filter technique that calculates a SER (Signal to Echo Ratio), derives a suppression "gain" to be applied, and may also inject comfort noise when desired (e.g., when there would otherwise be no perceptible signal left after the gain is applied).

The techniques described below effectively estimate the residual echo level left in the signal, e.g., for input to the Wiener filter. In the discussion below, ERL refers to Echo Return Loss (ERL), which is the ratio between the original signal and the echo level expressed in decibels (dB). ERL is a measure of the loss of the signal output from the speakers 138 that comes back as echo on the microphone 140. The level estimating logic 214 may perform the estimate (for any number of channels) for the level at which the speakers 138 will output their signals.

ERLE refers to Echo Return Loss Enhancement, and represents the level of the signal before the echo canceller 208 (Lsin) minus the level of signal after the echo canceller (Lsout) 208. ERLE is a measure of how much attenuation the echo canceller 208 is applying. For example, if the signal is 20 dB lower after the echo canceller 208, then it may be assumed that the echo canceller 208 (for this particular frequency bin) has removed 20 dB of echo.

The parameter Acom refers to the sum of ERL and ERLE. The system tracks Acom as the difference between the level (in dB) of the signal played out of the speakers 138, minus the level of signal coming into the residual echo suppression logic 212. The system may track Acom for different reasons, and in particular because the system is interested in knowing the residual echo level in periods of double-talk. In these periods, the system may have trouble knowing the level of residual echo present in the signal coming to the echo suppression logic 212, because the undesired signal components are mixed with desired speech. In this regard, the system may estimate Acom (as Lrout−Lrout) during periods when the system believes that double-talk is not occurring (or when other significant undesired signal components are absent). The system uses the Acom estimate to predict the level of residual echo (based on Lrout) for those times when the system cannot specifically detect the residual echo because the residual echo is mixed with desired signal (e.g., speech input). The Acom tracking logic 216 may maintain the Acom estimate for any number of frequency bands. The level estimating logic 218 may provide the Acom tracking logic 216 with the estimate of the signal level after the echo canceller 208.

Regarding the frequency bands, the system may be designed to accommodate any compromises and tradeoffs in terms of performance, processing cost and processing delay. Accordingly, the system may implement any of a wide array of frequency band processing configurations. In some implementations, the system may implement a non-uniform frequency resolution that corresponds to human perception. Such a frequency resolution may be characterized by higher frequency resolution at lower frequencies, then lower resolution at high frequencies. The Bark scale provides one example of a suitable non-uniform frequency resolution. As another example, there may be 16 to 64 frequency bands for 16 kHz audio signals.

In some implementations, the system may determine when it is receiving audio to output and no (desired) microphone input. During those times, the system may analyze the level of receive signal on the microphone input, which reflects only audio output echo (e.g., the left channel Lrout) through the speakers 138, and may subtract the level of send in, the input signal from the microphone 140 (Lsin). The system thereby obtains the attenuation through the acoustic environment 206 from the speaker 138 to the microphone 140 (ERL). During these times also, the system may update its ERL, ERLE, and Acom estimates.

Given the estimate of Acom, the system may determine an estimated residual echo. In particular, the system determines an estimated receive out signal level, LroutEst, for any selected number of frequency bins. The system subtracts Acom from LroutEst to obtain an estimate of residual echo remaining on the microphone input to the residual echo suppression logic 212. The estimate of residual echo facilitates determination of the SER, and then the subsequent operation of the Wiener filter to remove the residual echo.

As a specific example, assume Lrout=50 dB, and 40 dB returns as echo on the microphone input. Then, ERL=10 dB, and there is 40 dB of undesired signal (e.g., echo) on the microphone input. Assume the echo canceller 208 attenuates by 25 dB. Then ERLE=25 dB, and there is still 50−10−25 dB=15 dB of residual echo left in the microphone signal. In this example, Acom=10 dB+25 dB=35 dB. Given an estimate of LroutEst, LroutEst−Acom represents the residual echo level estimated to exist after the echo canceller 208. In that regard, LroutEst may represent the level of the known receive out signal, Lrout, after accounting for other effects, e.g., the estimated effects of decay/dispersion.

The description above is specific to a certain channel (e.g., the left channel). Note, however, that the system may track Acom for each receive out channel. The individual Acom channel parameters may be provided to corresponding individual instances of the decision logic 222. There may be a logical or physical instance of decision logic 222 for each receive out channel, and subsequent merge logic 224 may combine the outputs of the multiple instances of the decision logic 222 as described below.

The techniques described below help the system manage the difficult scenario in which extended spatial quiescence is followed by a fast change to spatial richness, which may include changes in spatial image. An example of what is meant by spatial richness and spatial quiescence is provided below in the discussion of FIG. 3. In such situations, there may be a great deal of residual echo in the microphone signal after the change, but the Acom estimates do not reflect the change. As a result, the significant residual echo may pass through un-attenuated and un-suppressed.

Figure 3:
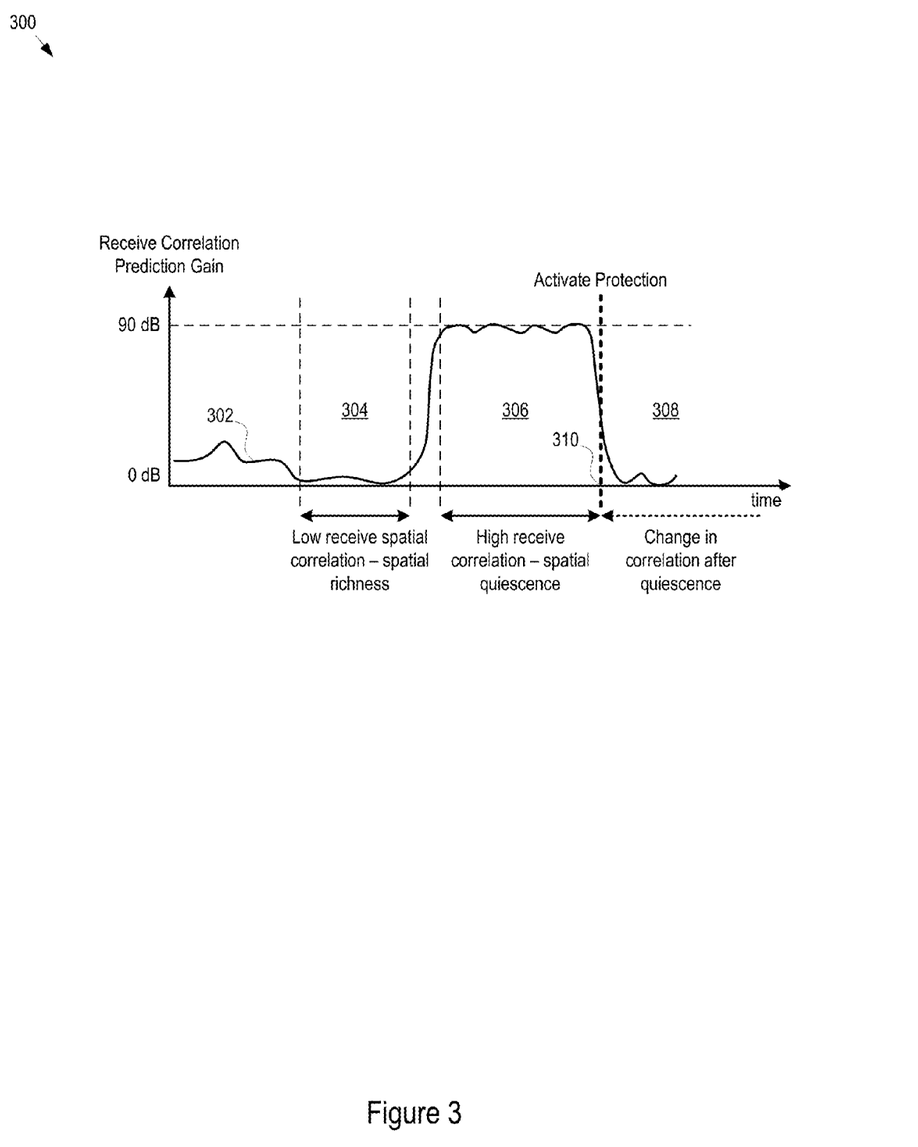
FIG. 3 shows a signal example.

FIG. 3 shows a signal example 300 to help illustrate the scenario noted above. The correlation signal 302 illustrates the correlation between selected audio receive-in channels, e.g., a left stereo and a right stereo output. When the channels are very different from one another in their various frequency bands (e.g. at area 304), they are considered spatially rich, and there is little receive correlation between them. When the channels are strongly correlated, however (e.g., at area 306), the channels are considered spatially quiescent. As shown in FIG. 3, the inter-channel correlation changes rapidly, at area 308, back to low spatial correlation. The correlation may be measured, for example, by the MSC, the Magnitude Square Coherence. An MSC of 0 means completely uncorrelated signals and an MSC of 1 means the signals are fully correlated (perhaps modulo a constant).

The system activates a protection mechanism for rapid changes from spatial quiescence to spatial richness, e.g., at point 310, where the spatial image suddenly changes. At such points, Acom (which tends to slowly adapt) may still reflect the prior situation of spatial quiescence. The transition from spatial quiescence to spatial richness may, as examples, occur when the channels are suddenly no longer strongly correlated, or when the channels remain correlated but quickly shift in spatial image, e.g., from 90% Left 10% Right to 10% Left 90% Right. Even with correlated signals, the prediction filters take time to adapt to the change in spatial image, and the error output will become large while the sudden change happens.

The residual echo suppression techniques do not depend on spatial richness to be effective. Further, they do not require the receive processing logic 204 to break spatial correlation by adding distortion into the receive out channels. Further, the techniques protect against sudden changes in the spatial image, without affecting nominal echo suppression performance. The techniques quickly protect against unwanted echo when there are sudden changes from spatial quiescence to spatial richness, without affecting the system performance during periods of spatial richness or spatial quiescence. The techniques are particularly suitable at handling occurrences of double talk, which may frequently occur, e.g., during conference calls with multiple participants.

Returning again to FIG. 2, cross channel analysis logic is present. The cross channel analysis logic may be a cross channel linear predictor 220, a MSC estimator, or other type of channel predictor or channel correlation estimator. The channel predictor 220 attempts to predict one receive channel from another receive channel (e.g., to predict the left channel using the right channel). When the channel predictor 220 is able to do so, the channels are strongly correlated and there is low prediction error and high prediction gain. In other words, greater correlation will result in less prediction error. When the channels are not strongly correlated, there is high prediction error and low prediction gain.

Figure 5:
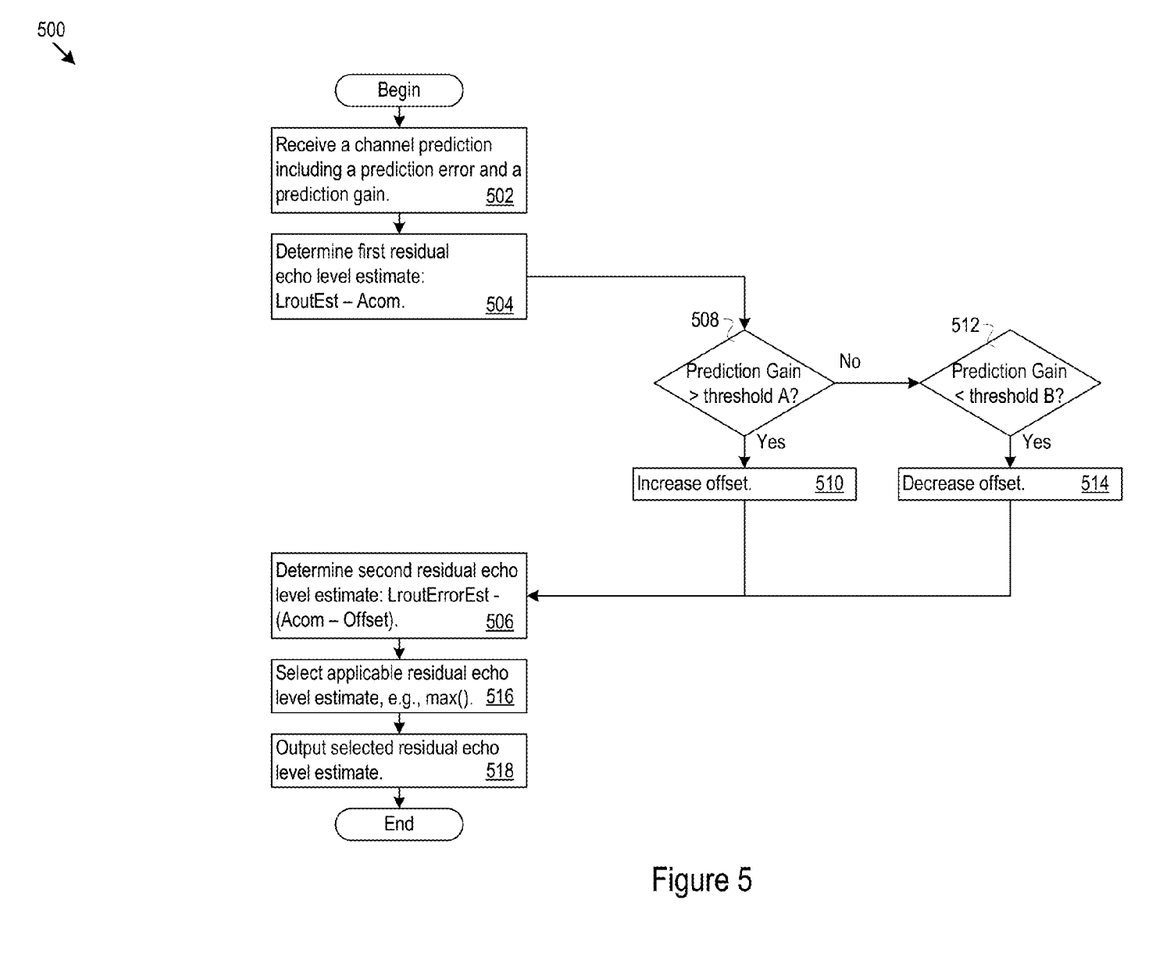
FIG. 5 shows logic for residual echo suppression.

Discussed in conjunction with FIG. 2, FIG. 5 illustrates logic 500 that the decision logic 222 may implement in any combination of hardware and software for residual echo estimation. The decision logic 222 generates a residual echo level estimate that protects against sudden changes in spatial image. The decision logic 222 may do so for each channel, or there may be individual instances of the decision logic 222 provided, one for each channel. The merge logic 224 combines the individual residual echo level estimates for each receive signal to provide an overall residual echo level estimate to the residual echo suppression logic 212. The merge logic 224 may, for example, add the individual echo level estimates in the power domain to obtain the overall residual echo level estimate.

The decision logic 222 receives a channel prediction including a prediction error level and prediction gain (502). The prediction error level estimate, LroutErrorEst for any given channel, is an estimate of the error in the channel prediction, and may also reflect application of a decay model to the channel. The decision logic 222 maintains a special residual echo level estimate determined from the prediction error level estimate, an echo cancellation estimate, and an offset, and determines which of multiple different residual echo level estimates to provide to the merge logic 224.

In one implementation, the decision logic 222 determines the residual echo level estimate for one or more receive out channels, 'c', where 'c' is an index ranging over the number of channels analyzed, according to:

$$\text{LsoutEst}_c = \max\{\text{LroutEst}_c - \text{Acom}_c, \text{LroutErrorEst}_c - (\text{Acom}_c - \text{Offset}_c)\}$$

In which:
($\text{LroutEst}_c - \text{Acom}_c$) is a first residual echo level estimate that the decision logic determines (504) for channel 'c'; and
($\text{LroutErrorEst}_c - (\text{Acom}_c - \text{Offset}_c)$) is a second residual echo level estimate that the decision logic determines (506) for channel 'c'.

In operation, the decision logic 222 maintains an offset. During periods of high signal correlation, when the prediction gain exceeds a configurable correlation increment threshold (508), the decision logic 222 increases the offset by a configurable increment value (510). During periods of low signal correlation, when the prediction gain is below a configurable correlation decrement threshold (512), the decision logic 222 decreases the offset by a configurable decrement value (514). The rates at which the offset is increased or decreased are also configurable parameters.

The system may decrement the offset in different ways in response to and depending on any desired system characteristics. For example, the decrements may depend on how Lsout compares to the estimated level for Lsout. As one possibility, the system may use larger decrements or faster decrements (or both) to more quickly disarm the trigger that causes the change in residual echo suppression (e.g., the increased residual echo suppression) than would otherwise be the case. As a specific example, when the system can determine from available parameters (e.g., Lsout and the estimate of Lsout) that the transition from spatial quiescence to spatial richness was relatively benign, then the system may more quickly decrement the offset to avoid over compensating for the transition.

The operational parameters noted above may vary widely based on the particular implementation characteristics for the system. Examples of such characteristics include the subband or frequency-domain decomposition that the system employs, as well as upon block size in implementations in which the system performs its analysis on a block basis. As just one of many possible examples, the threshold to increment or decrement the offset may be 10 dB, and the increment and decrement values may depend on the prediction gain. For instance, the increment and decrement values may be smaller when the gain is close to the threshold, and larger when the gain is far from the threshold. Regarding rate of change, as one example the system may bound the increments and decrements such that the offset may increase or decrease within a configurable limit, e.g., 20 dB, per second. The system may also enforce bounds that limit the offset itself, e.g., to 20 or 30 dB.

Note that the decision logic 222 determines the second residual echo level estimate using the echo estimate error, LroutErrorEst. When there is strong channel correlation, the decision logic 222 increases the offset because the prediction gain will be high. During this time, the prediction error level (e.g., LroutErrorEst) is small because the channel correlation is high and the channel predictor is able to accurately predict one channel from another. Subtracting (Acom−Offset) from LroutErrorEst thus results in a small term. As a result, the nominal residual echo level estimate (LroutEst−Acom) is the output of the selection function (e.g., the max( ) function).

When there is weak channel correlation, the decision logic 222 decreases the offset because the prediction gain will be low. During this time, the prediction error level (e.g., LroutErrorEst) is high because the channel correlation is low and the channel predictor is unable to accurately predict one channel from another. Subtracting (Acom−Offset) from LroutErrorEst also results in a small term in this scenario. As a result, the nominal residual echo level estimate (LroutEst−Acom) is the output of the selection function (e.g., the max( ) function).

However, when a sudden change in spatial position happens, the offset is high because the decision logic 222 was increasing it during the period of spatial quiescence. Then, when the sudden change happens (e.g., point 302) the error estimate of the channel predictor 220 is suddenly large, e.g., initially as large as the receive signal itself. At that time, the decision logic is subtracting a small term (Acom−Offset) from the prediction error level. As a result, the term (LroutErrorEst−(Acom−Offset)) is relatively large. This large term will exceed the nominal residual echo level estimate, and therefore become the residual echo level estimate output of the decision logic 222. The large term signifies that a high level of residual echo may be present, and the residual echo suppression logic 212 may respond by more heavily suppressing the microphone signal.

Expressed another way, during spatial richness, the offset is near 0 dB and LroutErrorEst is about equal to LroutEst, so the mechanism is transparent. Further, during spatial quiescence, the offset is large but the prediction error level LroutErrorEst is very small, so the mechanism is again transparent. However, for an abrupt change in spatial image following spatial quiescence, the mechanism provides protection, and then it disarms gradually as the prediction gain becomes small again as the channel predictor reconverges. In other words, the increased residual echo suppression is additional suppression over the usual, nominal amount that would be applied or chosen when operating according to just the first residual echo level estimate (obtained by subtracting the echo cancellation estimate Acom from the estimated receive out signal level). After the decision logic 222 triggers the increased residual echo suppression in response to the second residual echo level estimate, the decision logic 222 gradually transitions back to the nominal amount due to the effect of the offset parameter.

The decision logic 222 selects an applicable residual echo level estimate (516). The selection is done from among multiple estimates. The decision logic 222 also outputs the selected residual echo level estimate (518) to subsequent processing stages. Note that there may be a residual echo level estimate for each channel, and these estimates may be merged or combined, e.g., in the merge logic 224, to provide an overall residual echo level estimate, LsoutEst, to subsequent processing stages.

Figure 4:
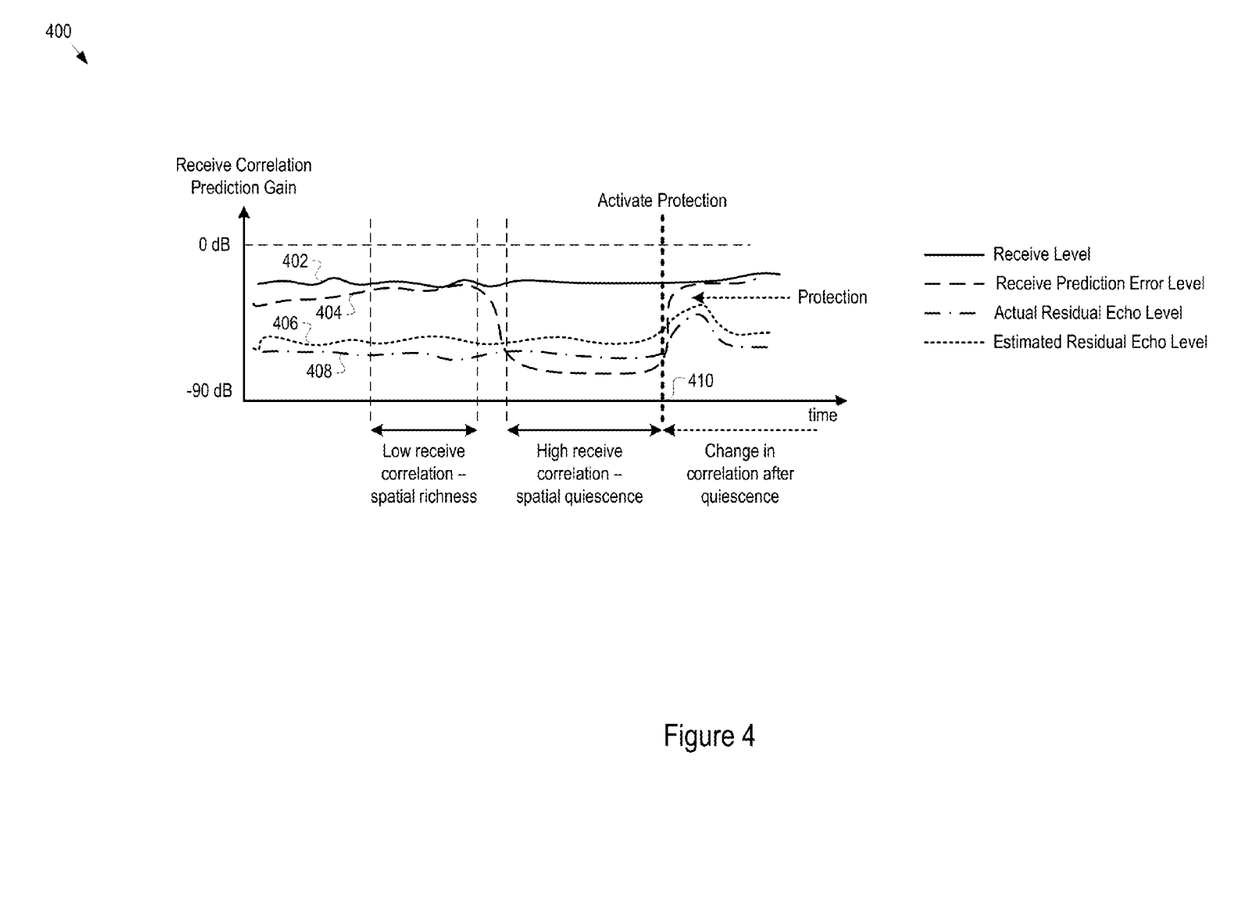
FIG. 4 shows a signal behavior example.

FIG. 4 shows a signal behavior example 400. In the example 400, the receive level 402 shows the level of a received channel (e.g., the left or right audio channels). Note that the receive level 402 remains relatively flat throughout, and does not reveal changes from spatial quiescence to spatial richness that could be used to trigged the protective mechanism. The example 400 also shows the receive prediction error level 404, the estimated residual echo level 406, and the actual residual echo level 408.

Note that the prediction error level 404 is low during spatial quiescence. Note also that the prediction error level 404 exhibits a sudden increase at point 410, where spatial quiescence gives way to spatial richness. The sudden increase triggers the protective mechanism explained above and the system implementation 200 reacts much more quickly to suppress the residual echo that may be present, compared to a system without the protection mechanism.

In multi-channel systems, the cross-channel linear predictors may be replaced by many-to-one channel predictors. Accordingly, the system may be extended beyond two channel audio systems to 5.1, 7.1, or any other system. Furthermore, there is no requirement that the channels carry any particular type of content. Instead, the system applies to any output that may echo back onto an input signal, whether that content is speech, music, an AV track for a movie, or any other content or combination of content.

In other implementations, the system may employ a system-distance approach to residual echo level estimation. In that case, the decision logic 222 may determine multiple residual echo level estimates, and select an applicable estimate, according to:

$$\text{LsoutEst} = \max\{\text{LroutEst} + 20\log_{10}d, \text{LroutErrorEst} + (20\log_{10}d + \text{Offset})\}$$

where 'd' represents system distance. A discussion of system distance may be found in, as examples: 1) Chapter 13 of E. Hansler and G. Schmidt, "Acoustic Echo and Noise Control—A Practical Approach," May 2004, Wiley-IEEE Press; and 2) S. Goetze, M. Kallinger, and K.-D. Kammeyer, "Residual Echo Power Spectral Density Estimation Based on an Optimal Smoothed Misalignment For Acoustic Echo Cancellation," in *Proc. Int. Workshop on Acoustic Echo and Noise Control (IWAENC-2005)*, Eindhoven, The Netherlands, 12-15 Sep. 2005, pp. 209-212.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A system comprising:
   multiple receive out channels;
   a microphone input channel; and
   decision circuitry configured to:
      determine a nominal level of echo suppression for the microphone input channel responsive to an estimated receive out signal level and an echo cancellation estimate;
      detect a transition from spatial quiescence to spatial richness in the multiple receive out channels; and
      in response to the transition, trigger a change comprising additional echo suppression on the microphone input channel over the nominal amount.

2. The system of claim 1, where the decision circuitry is further configured to:
   prevent the change in an absence of the transition.

3. The system of claim 1, where the microphone input channel comprises a microphone input signal after echo cancellation.

4. The system of claim 1, where spatial richness comprises a change in spatial image among the multiple receive out channels.

5. The system of claim 1, where the decision circuitry is configured to determine spatial richness and spatial quiescence according to a correlation measure between the multiple receive out channels.

6. The system of claim 5, further comprising:
   a cross channel estimator configured to provide the correlation measure.

7. The system of claim 6, where the correlation measure comprises either or both of a prediction gain and a prediction error level.

8. The system of claim 1, where the decision circuitry is further configured to transition, after triggering increased residual echo suppression, back to the nominal amount.

9. The system of claim 1, further comprising:
   a cross channel estimator configured to perform an analysis of the multiple receive out channels and determine a correlation error level responsive to the analysis;
   where the decision circuitry is configured to determine a second residual echo level estimate using the correlation error level; and
   where the decision circuitry is configured to detect the transition when:
   the second residual echo level estimate exceeds the first residual echo level estimate.

10. The system of claim 1 where the decision circuitry is configured to:
    determine a second echo level estimate responsive to a correlation among the multiple receive out channels; and
    provide the second echo level estimate to echo suppression circuitry for the microphone input channel.

11. The system of claim 7, where the cross channel estimator is configured to detect the transition responsive to an increase in the prediction error, a decrease in the prediction gain, or both.

12. The system of claim 1 where the decision circuitry is configured to determine an echo level estimate for each of the multiple receive out channels.

13. A system comprising:
    a microphone input;
    a first audio output;
    a second audio output;
    circuitry in communication with the microphone input, first audio output, and the second audio output, the circuitry configured to:
       determine a first residual echo level estimate for the microphone input according to an estimated audio out signal level and an echo cancellation estimate;
       determine a second residual echo level estimate for the microphone input, the circuitry configured to adjust the second residual echo level estimate responsive to a correlation between the first audio output and the second audio output;
       responsive to the correlation, detect a transition between spatial quiescence to spatial richness; and
       responsive to the transition,
       provide the second residual echo level estimate to residual echo suppression circuitry for the microphone input to trigger a change comprising additional echo suppression over a nominal amount that would be applied when the first residual echo level estimate is provided.

14. The system of claim 13, where the circuitry is further configured to determine the correlation by:
    determining a prediction error level between the first and second audio outputs.

15. The system of claim 14, where the circuitry is further configured to determine the second residual echo level estimate responsive to a duration of the correlation.

16. The system of claim 14, where the circuitry is further configured to determine the second residual echo level estimate responsive to duration and strength of the correlation.

17. A method comprising:
    detecting a transition from spatial quiescence to spatial richness among multiple receive out channels; and
    in response to the transition, triggering a change comprising additional echo suppression on a microphone input channel over a nominal amount that would be applied when a first residual echo level estimate for the microphone input channel is determined according to an estimated receive out signal level and an echo cancellation estimate.

18. The method of claim 17, where detecting the transition comprises detecting a change in spatial image among the multiple receive out channels.

19. The method of claim 17, where detecting the transition comprises determining a correlation measure between the multiple receive out channels.

20. The method of claim 17, further comprising detecting the transition comprises detecting an increase in a prediction error, a decrease in a prediction gain, or both.

* * * * *

UNITED STATES PATENT AND TRADEMARK OFFICE
CERTIFICATE OF CORRECTION

PATENT NO. : 9,357,080 B2  
APPLICATION NO. : 13/945423  
DATED : May 31, 2016  
INVENTOR(S) : Franck Pascal Beaucoup et al.

Page 1 of 1

It is certified that error appears in the above-identified patent and that said Letters Patent is hereby corrected as shown below:

In the Claims

In column 12, claim 13, line 38, after "to the translation," insert --provide the second--.

In column 12, claim 13, line 39, delete "provide the second".

Signed and Sealed this  
Second Day of August, 2016

Michelle K. Lee  
*Director of the United States Patent and Trademark Office*